United States Patent [19]
Schlosser

[11] 3,818,332
[45] June 18, 1974

[54] TESTING SYSTEM FOR MEASURING THE CHARACTERISTICS OF A NETWORK OVER A VARIABLE FREQUENCY RANGE

[75] Inventor: Karl Schlosser, Planegg, Germany

[73] Assignee: Siemens AG, Berlin and Munich, Germany

[22] Filed: Mar. 8, 1973

[21] Appl. No.: 339,171

[30] Foreign Application Priority Data
Mar. 22, 1972 Germany............................ 2213995

[52] U.S. Cl............................................. 324/57 R
[51] Int. Cl............................................. G01r 27/00
[58] Field of Search................................. 324/57 R

[56] References Cited
UNITED STATES PATENTS

| | | | |
|---|---|---|---|
| 1,684,403 | 9/1928 | Mason........................... | 324/57 R X |
| 2,047,782 | 7/1936 | Jensen........................... | 324/57 R X |
| 2,580,803 | 1/1952 | Logan........................... | 324/57 R X |
| 2,622,127 | 12/1952 | Alsberg et al.................. | 324/57 R |
| 2,685,063 | 7/1954 | Alsberg........................ | 324/57 R X |
| 2,760,155 | 8/1956 | Kelly........................... | 324/57 R |
| 2,970,258 | 1/1961 | Sinclair........................ | 324/57 R |
| 3,379,975 | 4/1968 | Niedereder.................... | 324/57 R X |

Primary Examiner—Stanley T. Krawczewicz
Attorney, Agent, or Firm—Hill, Gross, Simpson, Van Santen, Steadman, Chiara & Simpson

[57] ABSTRACT

A testing system for determining the attenuation and phase shift characteristics of a network, wherein a variable frequency signal is applied to the network and simultaneously to a parallel path. The frequency of the signal passing through the test network is shifted to a first frequency range and the signal passing through the parallel network which does not contain the test network is shifted to a second frequency range; and these two signals are then combined and passed via a frequency converter stage to a pair of band pass filters, respectively tuned to pass the shifted and subsequently converted signal which has passed through the test network, and the shifted and subsequently converted signal which has passed through the parallel network. One of the said signals is, after passing the allocated band pass filter, converted to the same frequency as the other signal, this enabling a comparison of these signals with one another, so as to indicate attenuation and phase shifts in the test network.

5 Claims, 1 Drawing Figure

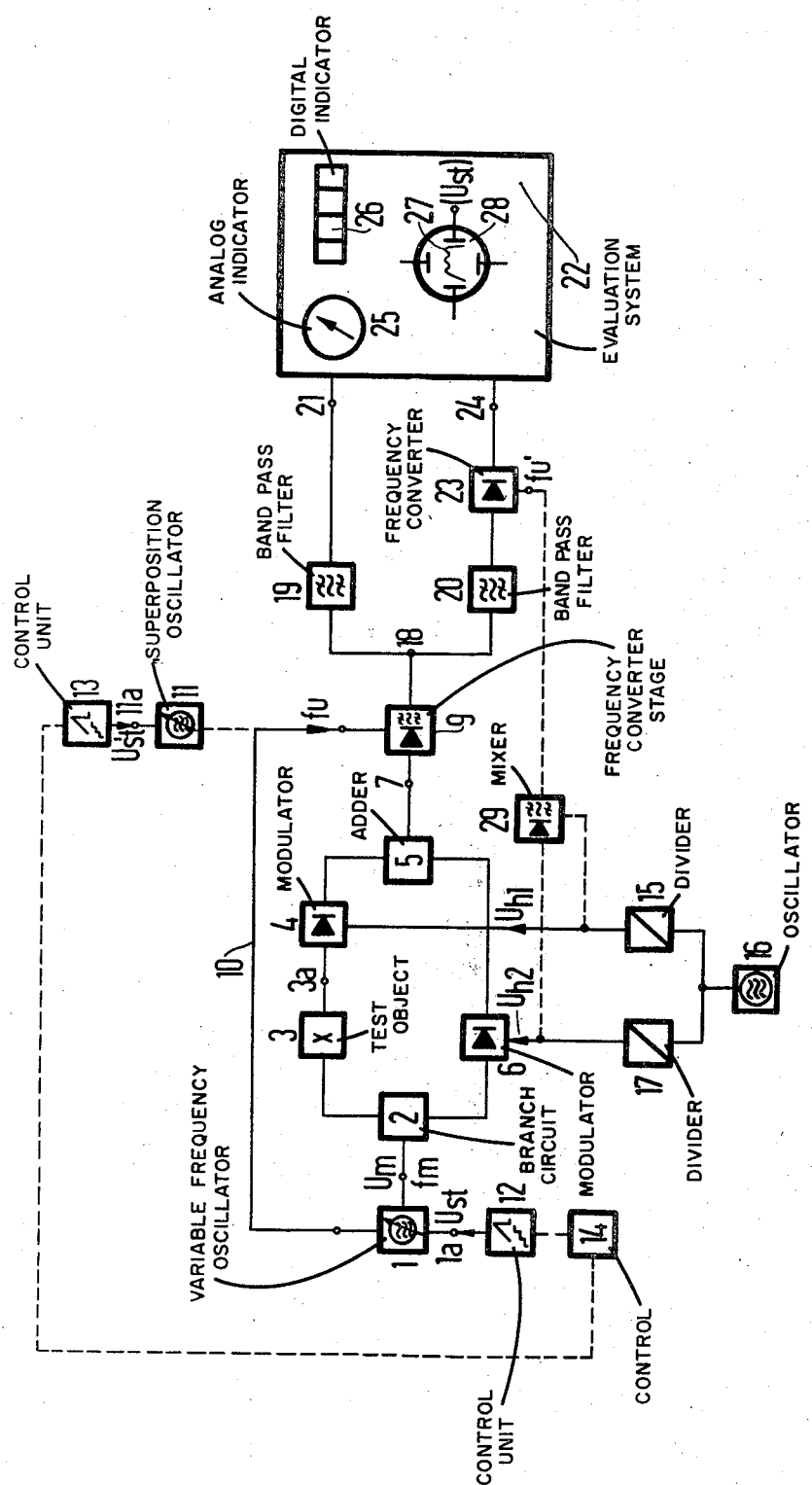

TESTING SYSTEM FOR MEASURING THE CHARACTERISTICS OF A NETWORK OVER A VARIABLE FREQUENCY RANGE

BACKGROUND OF THE INVENTION

1. Field of the Invention

This invention relates in general to frequency selective measuring circuits, in particular suited for wobble operation, wherein the applied frequency is varied over a frequency range for determining the transmission properties of a test object, and wherein a receiver which can be synchronized with the tuning of the transmitter to evaluate the signals received via the test object.

2. Prior Art

The magazine NTZ published in 1965, Volume 9, at page 509, Section 4.4.7 discloses a circuit for measuring the group delay through a test circuit, wherein a transmitter may be connected by a switch alternately to the test circuit and to a parallel branch which further includes a receiver which has a switch that can be synchronously connected to the branches including the test object and the parallel branch. A reference oscillator applies a variable frequency auxiliary signal to one of the inputs of the receiver which includes a phase meter. However, the continuous switching at the input and output between the branch including the test object and the parallel branch limits the maximum rate of frequency change which can be applied to the circuit without losing measuring accuracy.

SUMMARY OF THE INVENTION

The present invention comprises a test circuit and arrangement, wherein a variable frequency test generator applies a signal to a test object whose attenuation and phase characteristics are to be determined and simultaneously applies a signal to a parallel branch, which does not include the test object. The output of the test object is applied to a mixer where its output is converted to a first frequency range and the signal in the parallel branch is passed through a mixer, where it is converted to a second frequency range different from that of the signal which passed through the test object. The signals are then added together and passed to a frequency converter which receives an input to convert its output to an I. F. frequency range. A pair of band pass filters are connected to the output of the frequency converter and are tuned to respectively pass the signal which passed through the test object and the signal which passed through the parallel branch. A frequency converter is connected to the output of the band pass filter which passes the signal which did not pass through the test object so as to convert it back to the same frequency range as the signals which pass through the test object. An evaluation system receives the output of the first band pass filter and the frequency converter following the second band pass filter so as to indicate the attenuation and phase characteristics of the test object. The evaluation system may produce digital and analogue outputs as well as provide an output on a cathode ray tube.

Other objects, features, and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

BRIEF DESCRIPTION OF THE DRAWING

The drawing is a block diagram of the novel testing system of the invention.

DESCRIPTION OF THE PREFERRED EMBODIMENTS

The FIGURE illustrates a preferred embodiment of the invention which comprises a variable frequency test oscillator 1 which applies a measuring signal $U_m$ of variable frequency $f_m$ to a branch circuit 2. The branch circuit 2 passes the input signal into two paths. In the first path the test object 3 is connected and has an output terminal 3a, which is connected to the input of a modulator or mixer 4. An adder 5 receives the output of the modulator 4. A second modulator or mixer 6 receives the second output from the branch circuit 2 and supplies an input to the adder 5. The modulators 4 and 6 are chosen so that their transmission characteristics are substantially similar, so that any attenuation or phase shift occurring in these units will be the same.

The output of adder 5 is connected to an input terminal 7 of a frequency converter stage 9, which receives an injection frequency which converts the signal into an intermediate frequency range. The converter stage 9 includes a modulator or mixer which receives a superposition frequency fu which is offset a fixed amount with respect to the measuring frequency fm. The superposition frequency fu is derived from the test oscillator 1 and is supplied by line 10 to the converter stage 9. Alternatively, the superposition frequency fu may be supplied by a superposition oscillator 11 as shown by dotted line in the FIGURE. A control unit 13 supplies an output at terminal 11a to the superposition oscillator 11 designated $U_s$, $_t$.

A control unit 12 supplies an input at terminal 1a to the test oscillator 1 which is $U_{st}$. A control 14 is connected to the control units 12 and 13 to synchronize them. The control 14 may be a master control system.

The modulators 4 and 6 receive injection voltages, respectively, from frequency dividers 15 and 17 which receive inputs from an oscillator 16. The injection voltage $U_{h1}$ from frequency divider 15 differs from the injection voltage $U_{h2}$ from the frequency divider 17 such that at least the side band frequencies fm plus or minus $U_{h1}$ and fm plus or minus $U_{h2}$ are in the pass band of the band pass filter in the converter stage 9.

An I. F. output terminal 18 is connected to a pair of band pass filters 19 and 20. The band pass filter 19 passes to the I. F. range converted side band frequency of the modulator 4 and the band pass filter 20 passes to the I. F. range converted side band frequency of the modulator 6. Thus, the frequencies passed by the filters 19 and 20 are not identical, however, they are not positioned so far apart that their voltages or phases will be subjected to different transmission characteristics and in particular the phase shifts will be the same as the signals pass from circuit point 7 to the outputs of the filters 19 and 20.

An evaluation system 22 has an input terminal which is connected to the output of the band pass filter 19, which is the input signal which has passed through the test object 3. The output of band pass filter 20 is supplied to a frequency converter 23 which supplies an input to a second input terminal 24 of the evaluation system 22. The frequency converter 23 converts the output of the band pass filter 20 to the same frequency range as the output of the band pass filter 19, so that the signals applied to the terminals 21 and 24 have the same frequencies. The same result may be obtained of course by shifting the frequency converter 23 to the other signal path, connecting it with the output terminal of the band pass filter 19.

The evaluation system 22 may be constructed in a known manner and indicates the desired transmission characteristics of the test object 3 from the voltages supplied at its input terminals 21 and 24. If, for example, the phase shift of the test object 3 is considered the voltages at terminals 21 and 24 may be supplied to the inputs of a phase detector or meter whose output voltage controls an analogue measuring value indicator 25, or it may be connected to a digital indicator 26 to indicate the phase difference of the signals applied to terminals 21 and 24. The phase shift can also be indicated in the form of a frequency curve on the screen of a cathode ray tube or other indicating device 28 in the case of automatic and periodic changes of the measuring frequency fm. The frequency deflection system of the indicator 28 may be supplied with an input signal from the transmitter control 12 ($U_{st}$) or with a voltage derived from the measuring signal $U_m$ through a frequency discriminator. The vector diagram of the transmission factor of the test object 3 indicating one point in a coordinate system for each value of fm respectively, the abscissa of which is proportional to the real part of the transmission factor, while its ordinate is proportional to the imaginary part can be obtained from the voltages supplied to the evaluation system 22. This can be accomplished, for example, with two phase detectors which have first inputs respectively connected to the input terminal 21 and with the first phase detector receiving an input at its second terminal from terminal 24, and the other phase detector receiving an input from the terminal 24 which is phase shifted by 90° before being supplied to the input of the second phase detector. The voltages emitted from the phase detectors then correspond directly to the real and imaginary parts of the transmission factor of the test object 3. If the signals are simultaneously applied to the deflection systems of the device 28, respectively, a vector diagram representation of the transmission characteristic in polar coordinates will be obtained. If the output voltages of the phase detectors are supplied individually to the vertical deflection system of indicator 28, a frequency curve of the real or imaginary parts of the transmission factor will be obtained respectively. It is to be realized, of course, that additional transmission properties of the test object 3 can be determined with an evaluation system 22, as for example attenuation characteristics, and the reflection factor of a test object.

The frequency converter 23 may receive an injection signal fu' obtained from a mixer 29 which respectively receives input frequencies $U_{h1}$ and $U_{h2}$ from the dividers 15 and 17.

In operation a test object is connected between the branch circuit 2 and terminal 3a and the output of the frequency modulated oscillator 1 is applied to the test object 3 as well as through the parallel branch which includes the modulator 6. The attenuation and phase shift characteristics of the modulators 4 and 6, as well as the band pass filters 19, 20 and converter 23, are chosen such that the attenuation and frequency shifts in the path through the test object 3 and the parallel branch will be equal. Thus, the measured phase and amplitude differences between the signals appearing at terminals 21 and 24 will depend only on the attenuation and phase characteristics of the test object 3, and thus an accurate measurement of the characteristics of the test object 3 can be accomplished.

The following is an example of a frequency plan for a preferred embodiment without limiting the invention to the particular frequencies.

The test transmitting generator 1 produces a momentary frequency $f_m = 50$ MHz.

The joint auxiliary alternating voltage source oscillator 16 produces a constant frequency of 1.28 MHz.

The frequency divider 15 divides the incoming frequency at a rate of 160 : 1.

The frequency divider 17 divides the incoming frequency at a rate of 100 : 1.

therefore the frequency of $U_{h1}$ is: $f_{h1} = 8$ kHz and the frequency of $U_{h2}$ is: $f_{h2} = 12.8$ kHz Modulator 4 produces (among other frequencies) a first lower side band frequency of 49.992 MHz (49.992 MHz = 50 MHz − 8 kHz).

Modulator 6 produces (among other frequencies) a first upper side band frequency of 50.0128 MHz (50.0128 MHz = 50 MHz − 8 kHz).

The specified side band frequencies are supplied via terminal 7 to converter 9, the superposition frequency $f_u$ of which is always adjusted (manually or automatically) to a value which is higher than $f_m$ by a constant amount of 100 kHz:

$$f_u = f_m + 100 \text{ kHz}$$

$f_u = 50.1$ MHz (momentary value)

Among other frequencies the specified side band frequencies are converted in 9 to the I. F. range by the superposition frequency $f_u$ as follows:

50.1 MHz − 49.992 MHz = 108 kHz (=converted first lower side band frequency)

50.1 MHz − 50.0128 MHz = 87.2 kHz (=converted first upper side band frequency)

The I. F. band pass range of the converter stage 9 is chosen to be 100 ± 12.8 kHz.

The band pass filter 19 having a band pass range of 108 ± 0.5 kHz selects from the output of 9 the first lower side band frequency of modulator 4 converted to the I. F. range of 108 kHz.

The band pass filter 20 having a band pass range of 87.2 ± 0.5 kHz selects from the output of 9 the first upper side band frequency of modulator 6 converted to the I. F. range of 87.2 kHz.

The injection frequency $f_u'$ of converter 23 is derived from $U_{h1}$ and $U_{h2}$ by adding their frequencies to one another:

$$f_u' = 20.8 \text{ kHz} = f_{U_{h1}} + f_{U_{h2}}$$

The output frequency of the band pass filter 20 is converted in 23 to a frequency of 108 kHz, which is the same as the output frequency of 19:

$$108 \text{ kHz} = 87.2 \text{ kHz} + f_u'$$

By sweeping $f_m$ periodically within a frequency range of 1 MHz to 100 MHz and sweeping $f_u$ within a range of 1.1 MHz to 100.1 MHz at the same time so as to keep these two frequencies at a constant frequency difference at all times, all of the frequency values on the output side of converter 9 will be kept constant, their values being as indicated above for a momentary value of $f_m = 50$ MHz.

Thus, it is seen that this invention provides a test circuit through a test object and a parallel path not through the test object, wherein the two signals can be compared to produce an output indicative of the phase shift and attenuation characteristics of the test object. Although the invention has been described with respect to preferred embodiments it is not to be so limited as changes and modifications may be effected which are within the intended scope of the invention as defined by the appended claims.

I claim:

1. A testing and measuring system comprising a test oscillator capable of producing a frequency modulated output signal, an evaluation system for comparing a pair of input signals to produce indications indicative of differences between said input signals, a test object for which the transmission properties are desired, a first signal path including said object connected between said test oscillator and said evaluation system, and a second signal path between said test oscillator and said evaluation system which does not include said test object, said input signals being continuously supplied to said evaluation system through said first and second signal paths, a first modulator in said first signal path for producing a first side frequency signal from said frequency modulated output signal, a second modulator in said second signal path for producing a second side frequency signal from said frequency modulated output signal, and a pair of auxiliary low frequency sources respectively connected to said first and second modulators, a common portion of said first and second signal paths comprising an adder receiving the outputs of said first and second modulators, a frequency converter receiving the output of said adder, said first and second signal paths separating after said frequency converter, a first band pass filter tuned to the converted first side frequency signal and connected between said frequency converter and said evaluation system in said first signal path, a second band pass filter in said second signal path tuned to the converted second side frequency signal and receiving an output of said frequency converter, a second frequency converter connected between one of said band pass filters and said evaluation system in the signal path allocated to that filter, and a mixer supplying an input to said second frequency converter, the output signal of said second frequency converter constituting one of said input signals and the output signal of the band pass filter in the signal path without said second frequency converter constituting the other of said input signals.

2. A testing and measuring system according to claim 1, wherein said evaluation system produces an indication of the frequency dependent transmission characteristics of said test object.

3. A testing and measuring circuit according to claim 1, wherein said evaluation system produces an indication of the frequency dependent phase shift of said test object.

4. A testing and measuring circuit according to claim 1, wherein said pair of auxiliary low frequency sources take the form of a joint auxiliary alternating voltage source and a pair of frequency dividers which receive the output of said joint auxiliary alternating voltage source and supply output to the said first and second modulators.

5. A testing and measuring circuit according to claim 1, further comprising a mixer receiving inputs from said pair of auxiliary frequency sources and supplying an input to said second frequency converter.

* * * * *